(12) United States Patent
Leedy

(10) Patent No.: US 8,286,957 B1
(45) Date of Patent: Oct. 16, 2012

(54) TEST-CYLINDER CARRYING APPARATUS AND ASSOCIATED METHOD

(76) Inventor: Debra Leedy, Cashtown, PA (US)

( * ) Notice: Subject to any disclaimer, the term of this patent is extended or adjusted under 35 U.S.C. 154(b) by 938 days.

(21) Appl. No.: 12/321,728

(22) Filed: Jan. 23, 2009

Related U.S. Application Data

(60) Provisional application No. 61/062,088, filed on Jan. 24, 2008.

(51) Int. Cl.
*B23Q 1/26* (2006.01)
*B65G 9/00* (2006.01)

(52) U.S. Cl. ........... 269/304; 220/500; 220/95; 294/146

(58) Field of Classification Search .................. 269/304, 269/95; 220/500; 294/146–164; 206/427–432
See application file for complete search history.

(56) References Cited

U.S. PATENT DOCUMENTS

| | | | |
|---|---|---|---|
| 2,644,220 A | | 7/1953 | Thaulow |
| 3,028,043 A | * | 4/1962 | Angstadt ...................... 206/202 |
| 3,888,348 A | * | 6/1975 | Frey .............................. 206/427 |
| 3,977,602 A | * | 8/1976 | Kirch .............................. 239/74 |
| 4,096,749 A | | 6/1978 | Stewart |
| 4,294,481 A | * | 10/1981 | Pearl ............................. 294/146 |
| 4,496,070 A | * | 1/1985 | Lane, Jr. ....................... 249/117 |
| 5,431,422 A | * | 7/1995 | Gamache ................... 280/47.19 |
| 5,947,351 A | * | 9/1999 | Garofalo et al. .............. 224/153 |

* cited by examiner

*Primary Examiner* — Lee D Wilson
*Assistant Examiner* — Marc Carlson

(57) ABSTRACT

A concrete test-cylinder carrying apparatus includes a handle, a base-plate, a plurality of anchor rods engaged with the handle and a plurality support rings horizontally aligned above the base plate. Concrete test cylinders are removably positioned through the support rings and rest on the base plate such that test cylinders are swiftly transported between remote locations. In an alternate embodiment, a first mechanism may be provided for uniformly reciprocating a male handle portion along a linear travel path to absorb operating forces exerted on the concrete test cylinders during transport procedures. A second mechanism may be provided for uniformly articulating the male handle portion along clockwise and counter clockwise arcuate paths to further absorb operating forces exerted on the concrete test cylinders during transport.

15 Claims, 16 Drawing Sheets

US 8,286,957 B1

TEST-CYLINDER CARRYING APPARATUS AND ASSOCIATED METHOD

CROSS REFERENCE TO RELATED APPLICATIONS

This application claims the benefit of U.S. Provisional Application No. 61/062,088, filed Jan. 24, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a test sample carrying apparatus and, more particularly, to a test-cylinder carrying apparatus for conveniently and securely transporting concrete test-cylinders from a field location to testing location.

2. Prior Art

In construction, concrete is a building material composed of mineral aggregates, cement, and water. Generally, the aggregates consist of fine gravels and sand, and the cement is Portland cement. These materials are mixed with water in specific ratios, after which a hydration process occurs in which the water is absorbed by the cement, and the hydrated cement binds the aggregates into a hard, durable, stone-like material. Concrete is the most widely used man-made building material on Earth, found in everything from building foundations to walls, roadways and driveways, bridges and overpasses, gateposts and fences. So prevalent is the use of concrete that, each year, more than 6 billion tons are produced—one ton for each man, woman, and child on the planet.

To be reliable in building application, ready-mix or fresh-poured concrete must be cured and then tested for its compressive strength. These tests must be performed by a certified ACI (American Concrete Institute) Concrete Field Testing Technician, Grade I; and are generally performed on two varieties of concrete poured into test-cylinders on the job-site; field-cured test-cylinders, which cure or set at the job-site; and standard-cured test-cylinders, which are cured in a laboratory under standardized conditions.

In either case, the certified testing technician follows a strict protocol for filling the test-cylinders—6"×12" or 4"×8" plastic canisters; mixing and tamping-down the concrete to remove all air pockets; sealing the cylinders to prevent contamination; labeling the cylinders accurately and clearly; and finally, carefully transporting the cylinders to the location in which they will cure. The site for curing will depend on ambient temperature and other considerations; in winter, for example, freezing temperatures are to be avoided. Temperature-controlled curing boxes are sometimes used for test-cylinders. In many cases, a water-bath will be prepared, and the test-cylinders—which are watertight when closed—will be set upright in the bath to cure. The cylinders must be transported to the testing lab within 48 hours of collection.

Clearly, the certified testing technician must spend considerable time and energy in transporting the test-cylinders. Like the rest of the testing work, transporting the cylinders must be done in a prescribed manner. According to guidelines issued by the National Ready Mix Concrete Association, "Move cylinder molds with fresh concrete very carefully by supporting the bottom." This is possible, of course, if one is moving the cylinders one by one—a process that is slow, inconvenient, and time-consuming.

Accordingly, a need remains for a test-cylinder carrying apparatus in order to overcome the above-noted shortcomings. The present invention satisfies such a need by providing an apparatus that is convenient and easy to use, lightweight yet durable in design, and designed for conveniently and securely transporting concrete test-cylinders.

BRIEF SUMMARY OF THE INVENTION

In view of the foregoing background, it is therefore an object of the present invention to provide an apparatus for carrying multiple concrete test cylinders at stable and upright positions for accurately measuring a curing process. These and other objects, features, and advantages of the invention are provided by a concrete specimen carrying apparatus for simultaneously transporting a plurality of existing concrete test cylinders between remote locations In a preferred embodiment, the concrete test-cylinder carrying apparatus preferably includes a handle having a grip portion attached thereto, and a base plate having a smooth and continuous top surface. The base plate is may be statically engaged with a distal end of the handle, and a plurality of anchor rods are preferably coupled to the handle. The anchor rods may extend laterally away from the handle, and a plurality of support rings may be connected directly to the anchor rods.

Such support rings are preferably arranged in such a manner that the support rings are horizontally aligned above the base plate. Notably, the support rings and the base plate are suitably sized and shaped for receiving and maintaining the existing concrete test cylinders at a substantially stable and vertically upright position during transport procedures. As noted hereinbelow, various quantities of support rings may be employed and should not be limited to any specific number.

In one embodiment, the distal end of the handle may be defined by a hollow female member and a proximal end of the handle may be defined by a hollow male member. Such male and female members may be telescopically interfitted with each other, as further explained hereinbelow. The anchor rods and the support rings may linearly extend along a horizontal plane that is registered parallel to the base plate. This is crucial for ensuring the concrete test samples are not sloshed around during transport procedures because it will undesirably skew the test results.

In one embodiment, the present invention may further include a mechanism for uniformly reciprocating the male member along a linear travel path to thereby absorb operating forces exerted on the existing concrete test cylinders during transport procedures. Notably, a linear distance between the support rings and the base plate is maintained constant as the male member uniformly reciprocates within the female member and along the linear travel path. Such a linear travel path is preferably registered parallel to corresponding longitudinal lengths of the male and female members respectively.

In particular, the uniform reciprocating mechanism may further comprise a first plunger dynamically seated within the male member and further be frictionally abutted directly against an inner wall thereof. A second plunger may be monolithically formed with the base plate and statically nested inside the female member. The mechanism may further include a stop member statically anchored inside the male member and intermediately positioned between the first and second plungers respectively. In this manner, the stop member is suitably sized and shaped such that the male member is prohibited from being separated from the female member as the male member is reciprocated along the linear path, upon receiving high impact forces are exerted on the carrying apparatus.

The uniform reciprocating mechanism may further include a rectilinear shaft having a fixed longitudinal length and further having axially opposed proximal and distal ends directly coupled to the first and second plungers respectively. The first plunger is slidably housed within the male member and remains continuously positioned above the stop member. Such an arrangement permits the first plunger to slide within the male member while the second plunger remains statically anchored to the base plate, for example. Advantageously, the support rings remain positioned about the concrete test cylinders when operating forces act upon the carrying apparatus during transport procedures. This ensures the concrete test cylinders will not prematurely fall off the base plate during transport procedures.

Such a reciprocating mechanism may further include first and second spring members anchored to the first and second plungers and the stop member respectively. Each of the first and second spring members may be alternately compressed and expanded as the male member is reciprocated along the linear path. In this manner, the first and second spring members absorb operating forces exerted on the male member and thereby maintain a constant linear distance between the support rings and the base plate as the male member telescopically slides within the female member. For example, the first spring member preferably expands about the shaft while the second spring member preferably compresses about the shaft such that the first spring member remains above the stop member while the second spring member remains below the stop member during reciprocating movement. This ensures the male member will not disengage the base plate during transport procedures.

In an alternate embodiment, the concrete test-cylinder carrying apparatus may further include a mechanism for uniformly articulating the male member along clockwise and counter clockwise arcuate paths to thereby absorb operating forces exerted on the existing concrete test cylinders during transport procedures. The clockwise and counter clockwise arcuate paths may be defined about a fulcrum axis passing through the male and female members.

Notably, the support rings and the base plate remain statically aligned and uniformly spaced apart as the male member is uniformly rotated along the clockwise and counter clockwise arcuate paths. In this manner, as an operator's hand naturally rotates as he/she transports the concrete test cylinders, the likelihood of undesirably sloshing the concrete inside the test cylinders is reduced. This ensures the concrete test cylinders are maintained at a substantially stable and vertically upright position during natural hand/arm movement while transporting the test cylinders.

The uniform articulating mechanism further includes an annular track formed about the second plunger and defined within the female member. A plurality of spring-actuated cams are diametrically offset from a center of the first plunger such that the spring-actuated cams continuously urge against an interior wall of the male member to thereby create a frictional force opposing random and premature rotation of the male member.

Thus, a distal end of the male member uniformly rotates within the track when the operating forces are exerted against the handle. Advantageously, the distal end of the male member may simultaneously rotate within the track while the male member linearly reciprocates along the linear path for absorbing both arcuate and linear operating forces during transport procedures respectively. The combination of absorbing both linear and arcuate impact forces reduces the likelihood of premature sloshing during transport because the impact forces are absorbed through the rotational movement between the handle and base plate.

The present invention may further include a method for simultaneously transporting a plurality of existing concrete test cylinders between remote locations. Such a method preferably includes the chronological steps of: providing a handle having a grip portion attached thereto; providing a base plate having a smooth and continuous top surface; and statically engaging the base plate with a distal end of the handle.

The method may further include the chronological steps of: providing and coupling a plurality of anchor rods to the handle such that the anchor rods extend laterally away from the handle; providing and connecting a plurality of support rings directly to the anchor rods; and arranging the support rings in such a manner that the support rings are horizontally aligned above the base plate.

The method may further include the chronological steps of: the support rings and the base plate receiving and maintaining the existing concrete test cylinders at a substantially stable and vertically upright position during transport procedures; and absorbing operating forces exerted on the existing concrete test cylinders during transport procedures by uniformly reciprocating the male member along a linear travel path as well as uniformly articulating the male member along clockwise and counter clockwise arcuate paths. Notably, a linear distance between the support rings and the base plate is maintained constant as the male member uniformly reciprocates within the female member and along the linear travel path to prevent premature concrete sloshing during transport.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
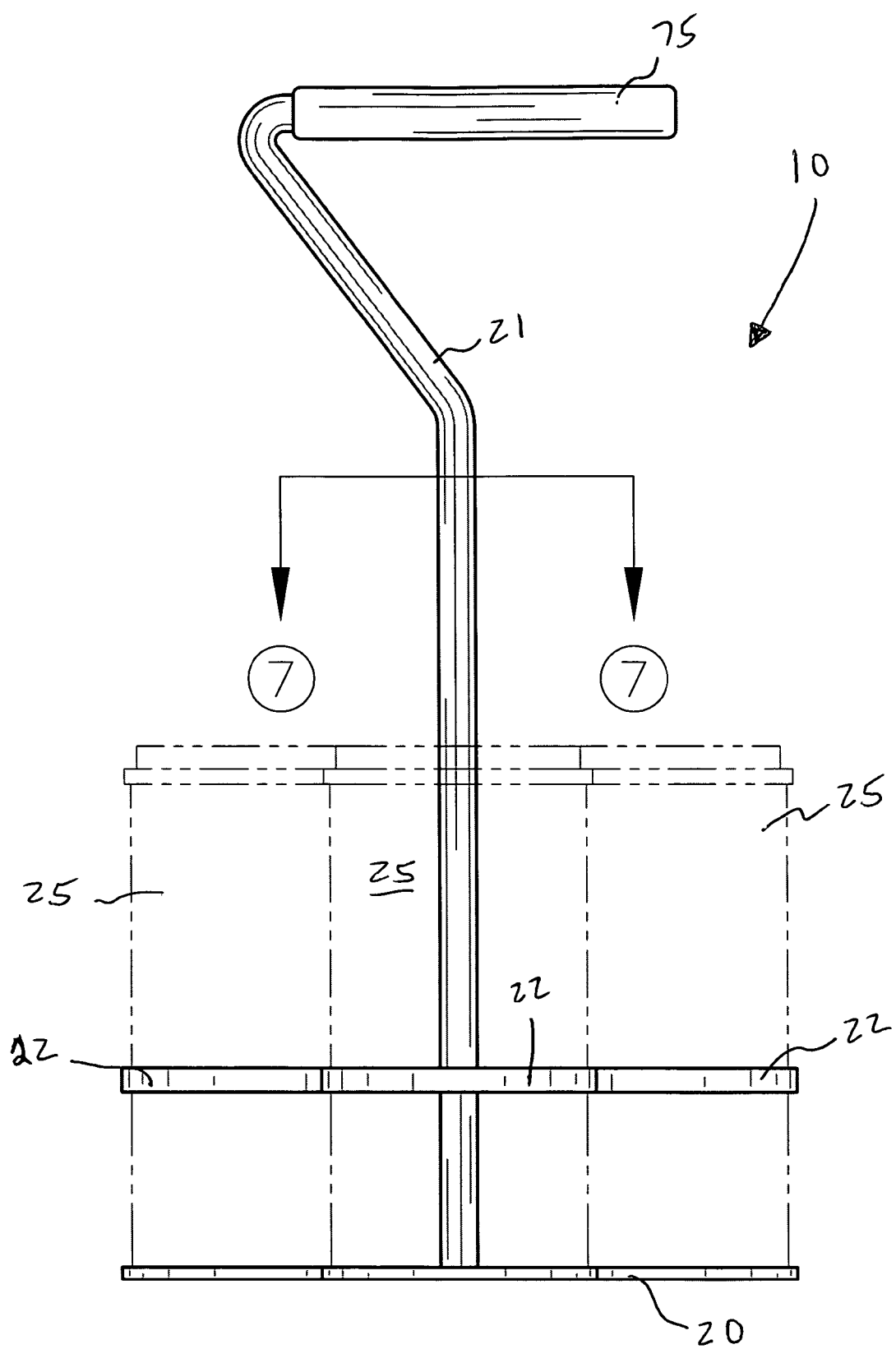
FIG. 1 is a left side elevational view showing a preferred embodiment of a concrete test cylinder carrying apparatus, in accordance with the present invention.
Figure 2:
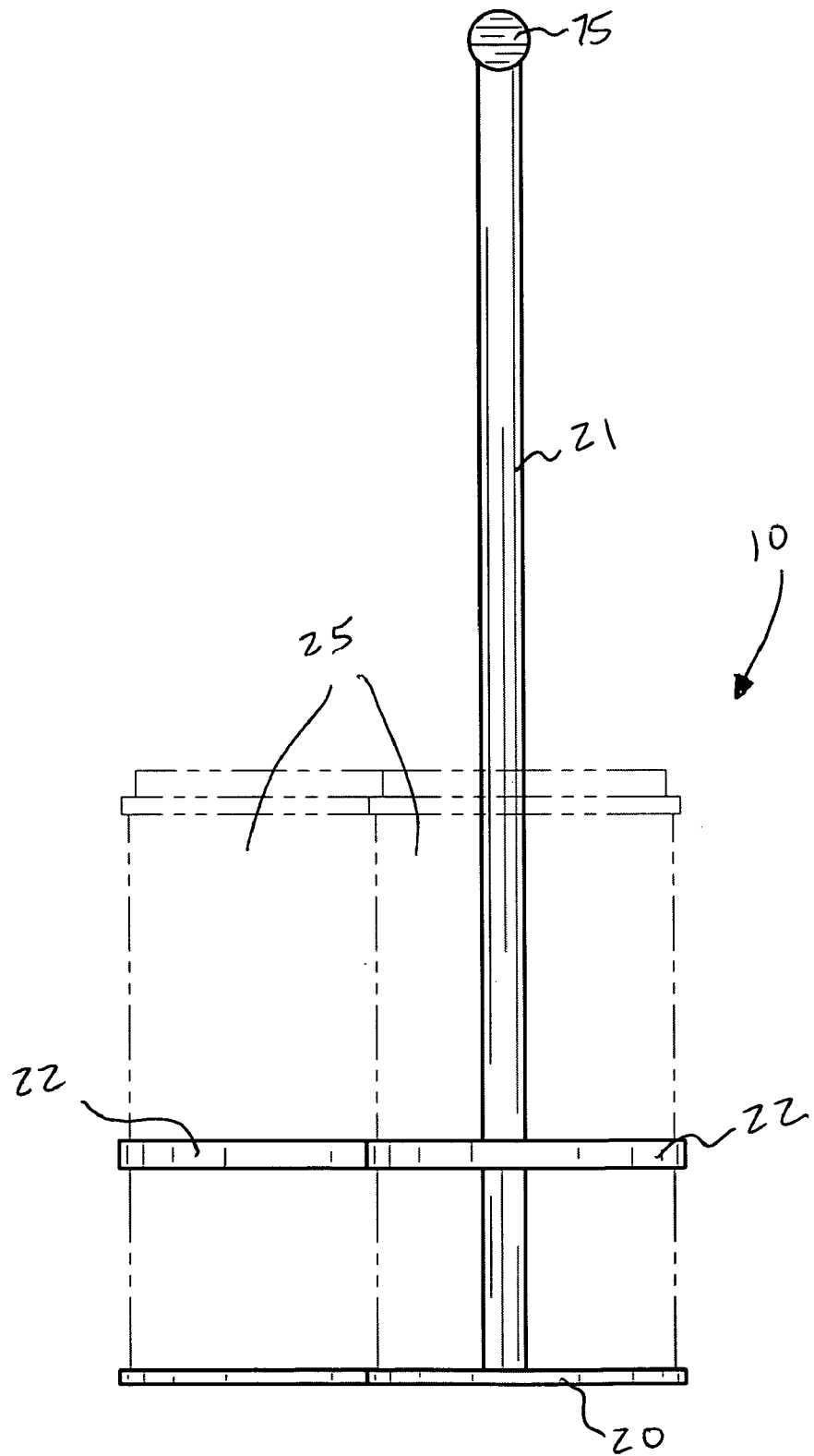
FIG. 2 is a front elevational view of the carrying apparatus shown in FIG. 1.
Figure 3:
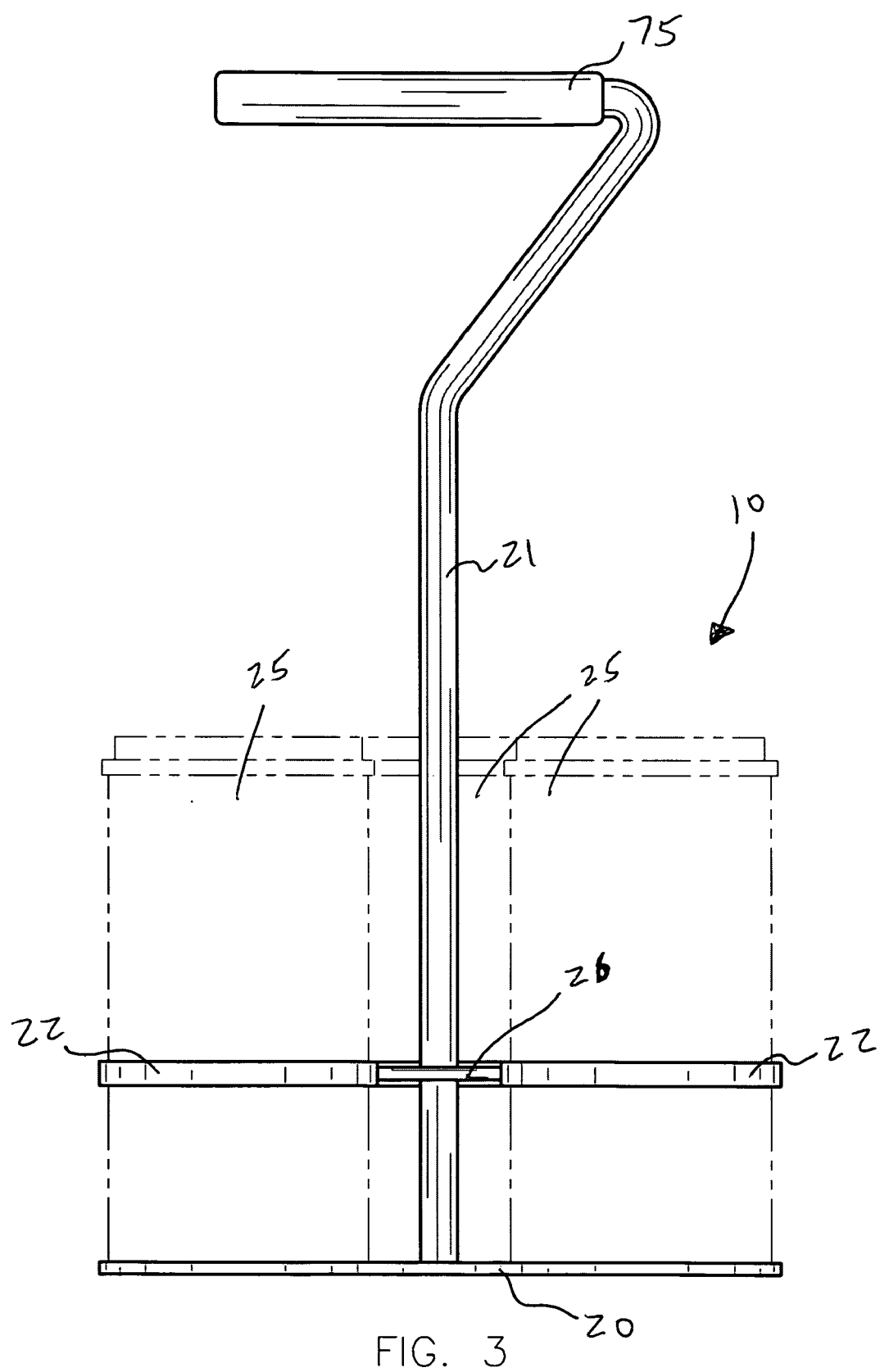
FIG. 3 is a right side elevational view of the carrying apparatus shown in FIG. 1.
Figure 4:
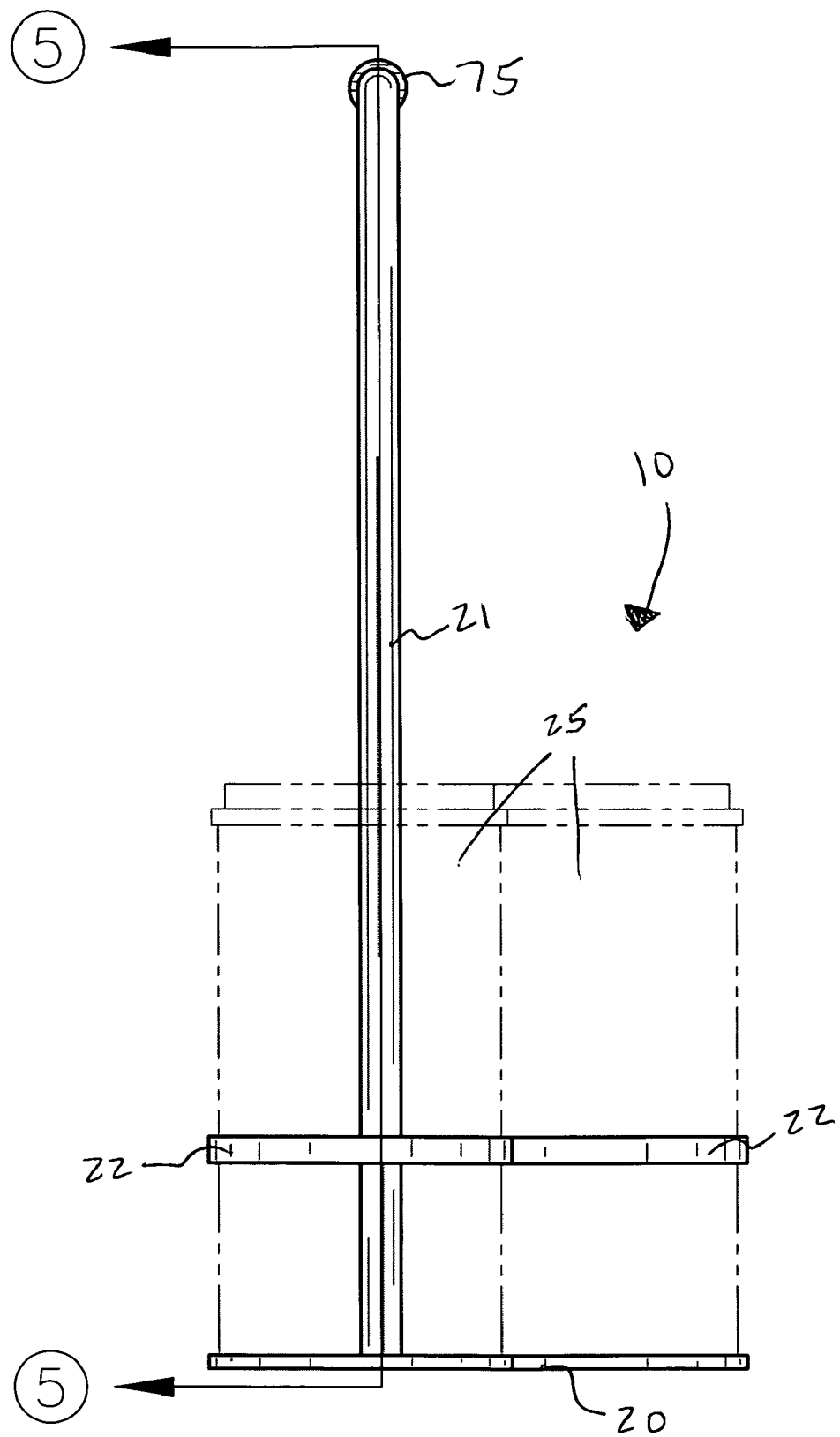
FIG. 4 is a rear elevational view of the carrying apparatus shown in FIG. 1.
Figure 5:
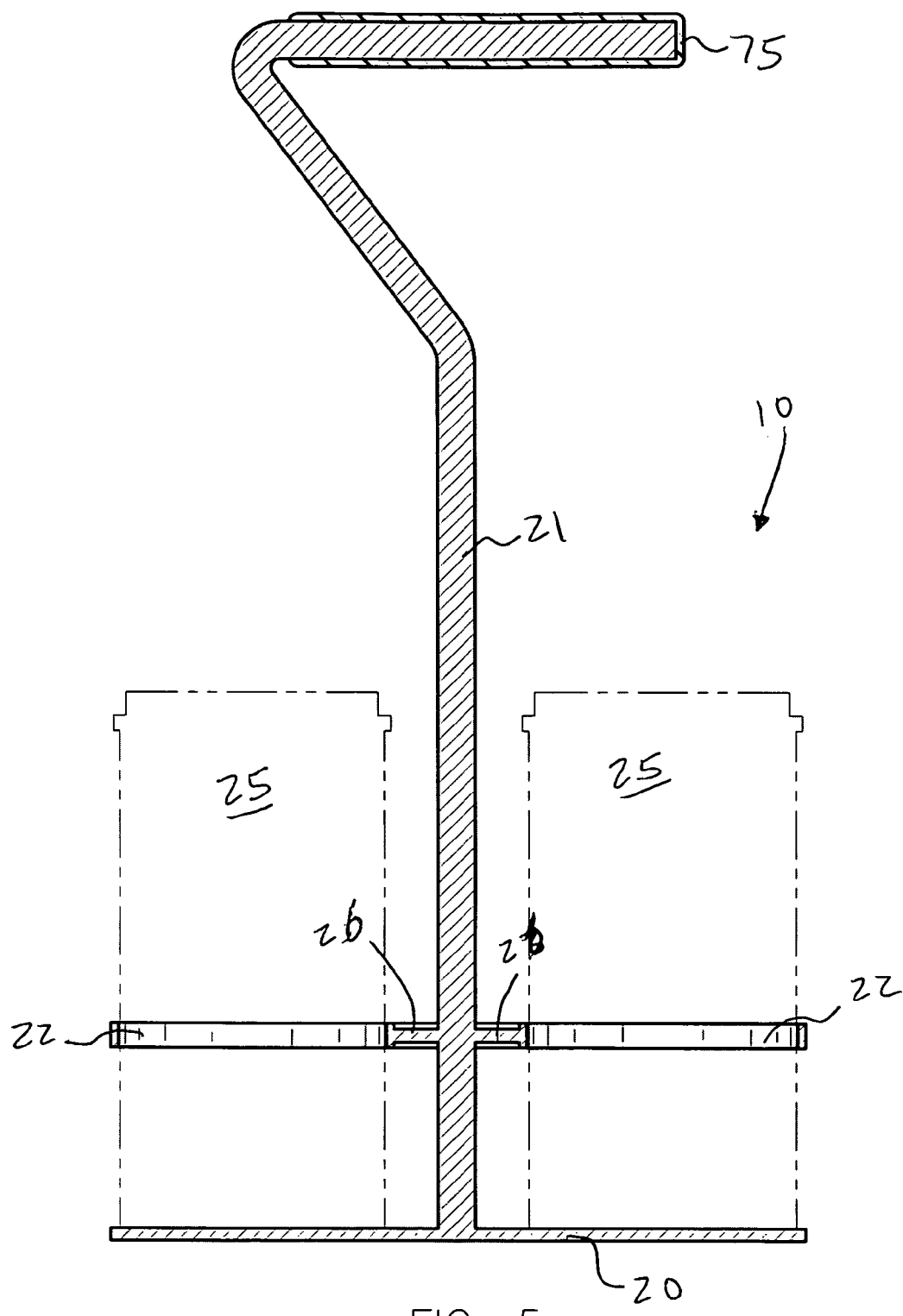
FIG. 5 is a cross-sectional view of the carrying apparatus, taken along line 5-5 in FIG. 4.
Figure 6:
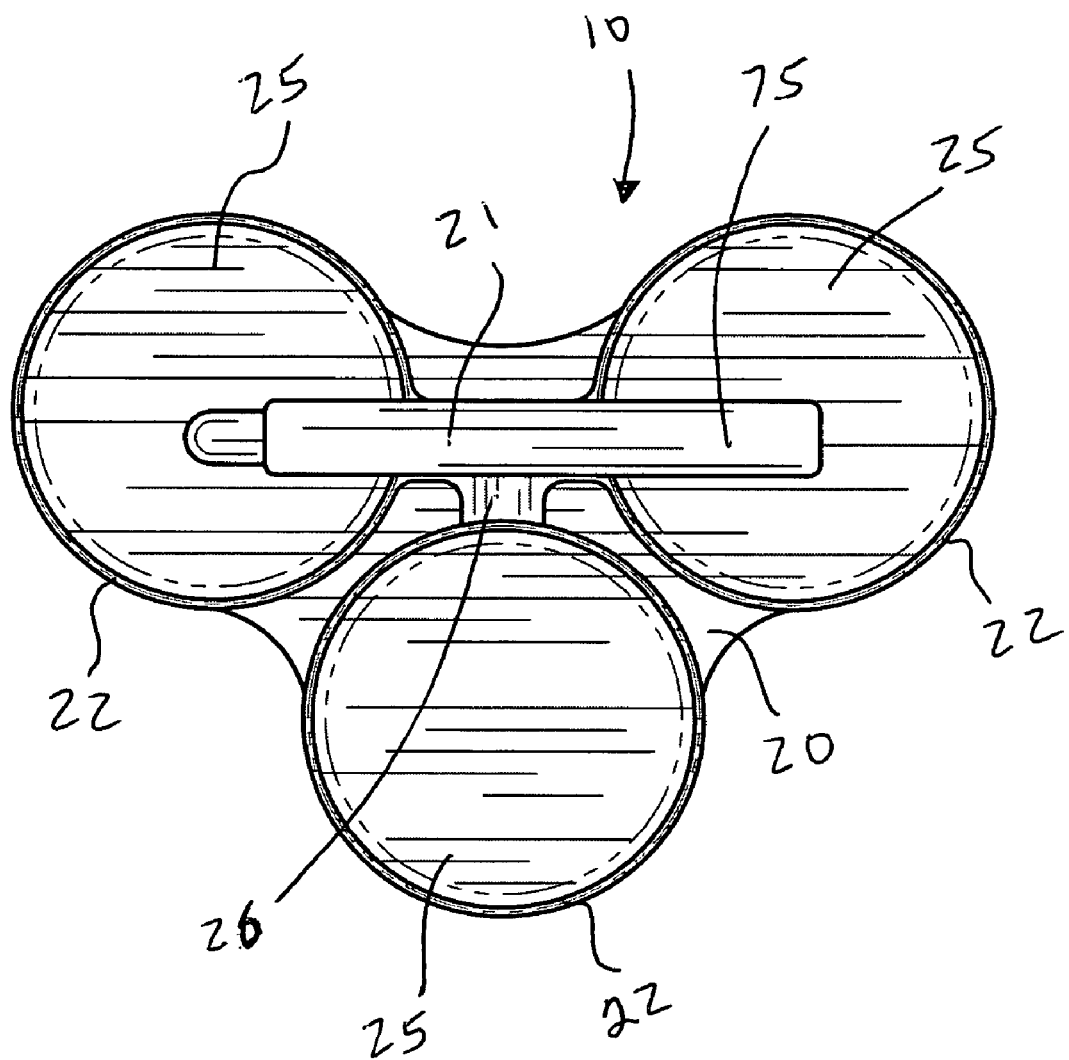
FIG. 6 is a top plan view of the carrying apparatus, shown in FIG. 1.
Figure 7:
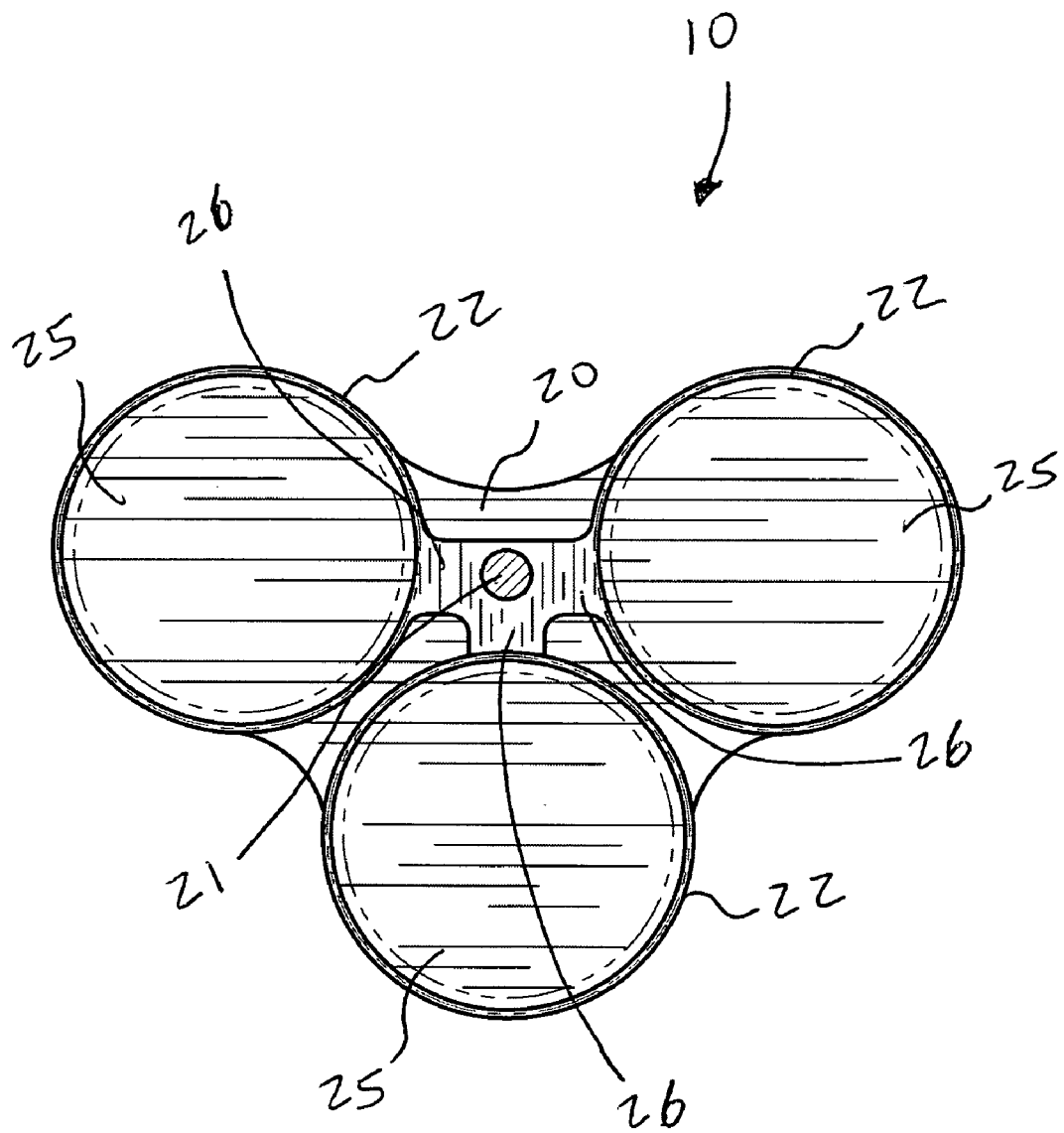
FIG. 7 is a cross-sectional view of the carrying apparatus, taken along line 7-7 in FIG. 6.
Figure 8:
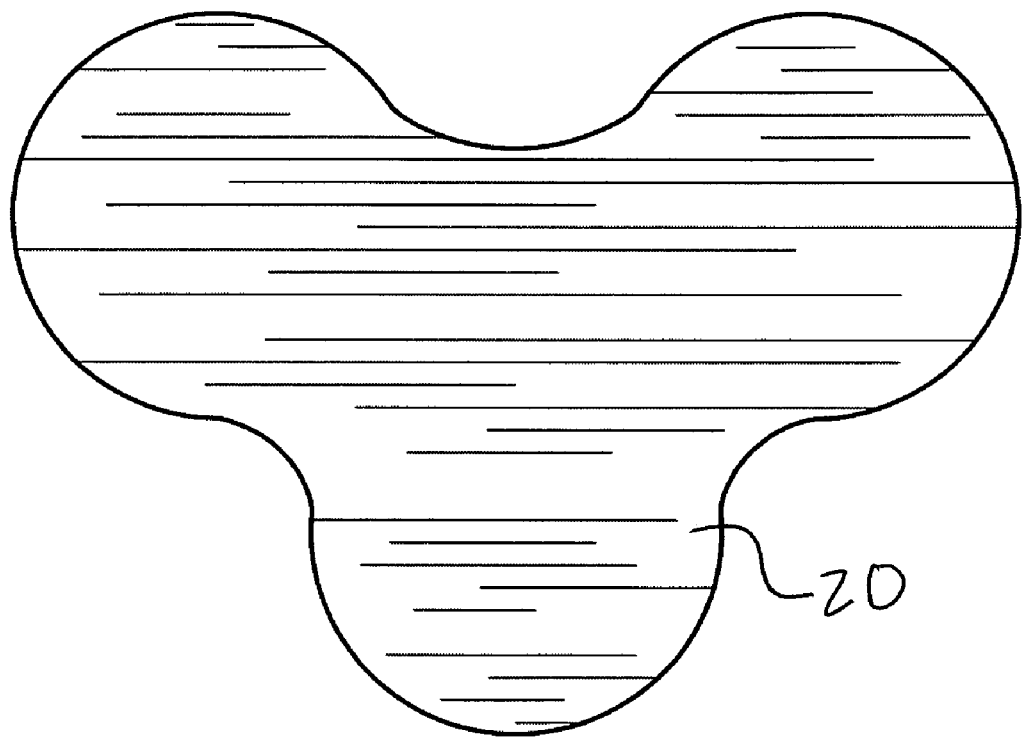
FIG. 8 is a bottom plan view of the carrying apparatus, shown in FIG. 1.
Figure 9:
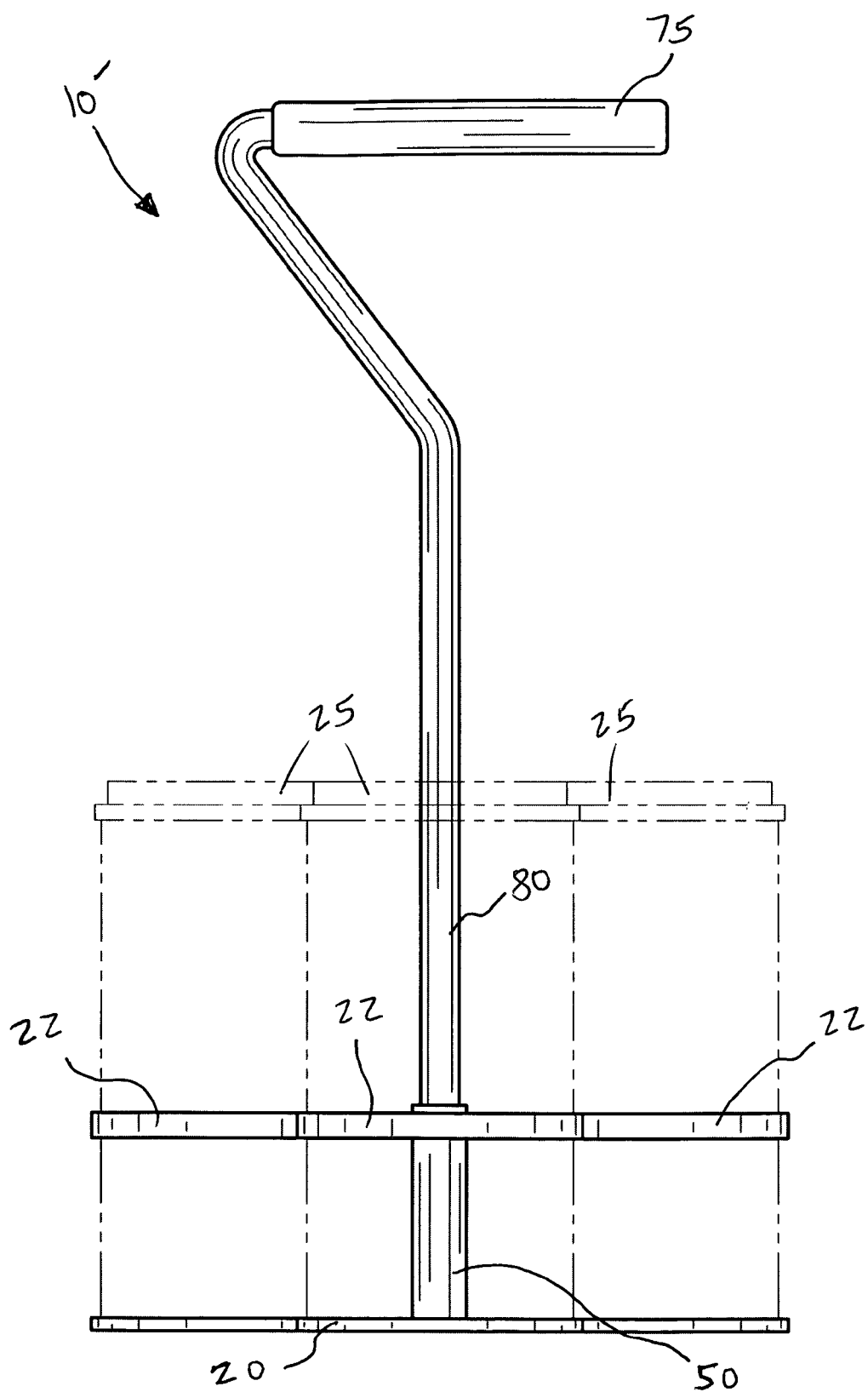
FIG. 9 is a left side elevational view showing an alternate embodiment of the carrying apparatus, in accordance with the present invention.
Figure 10:
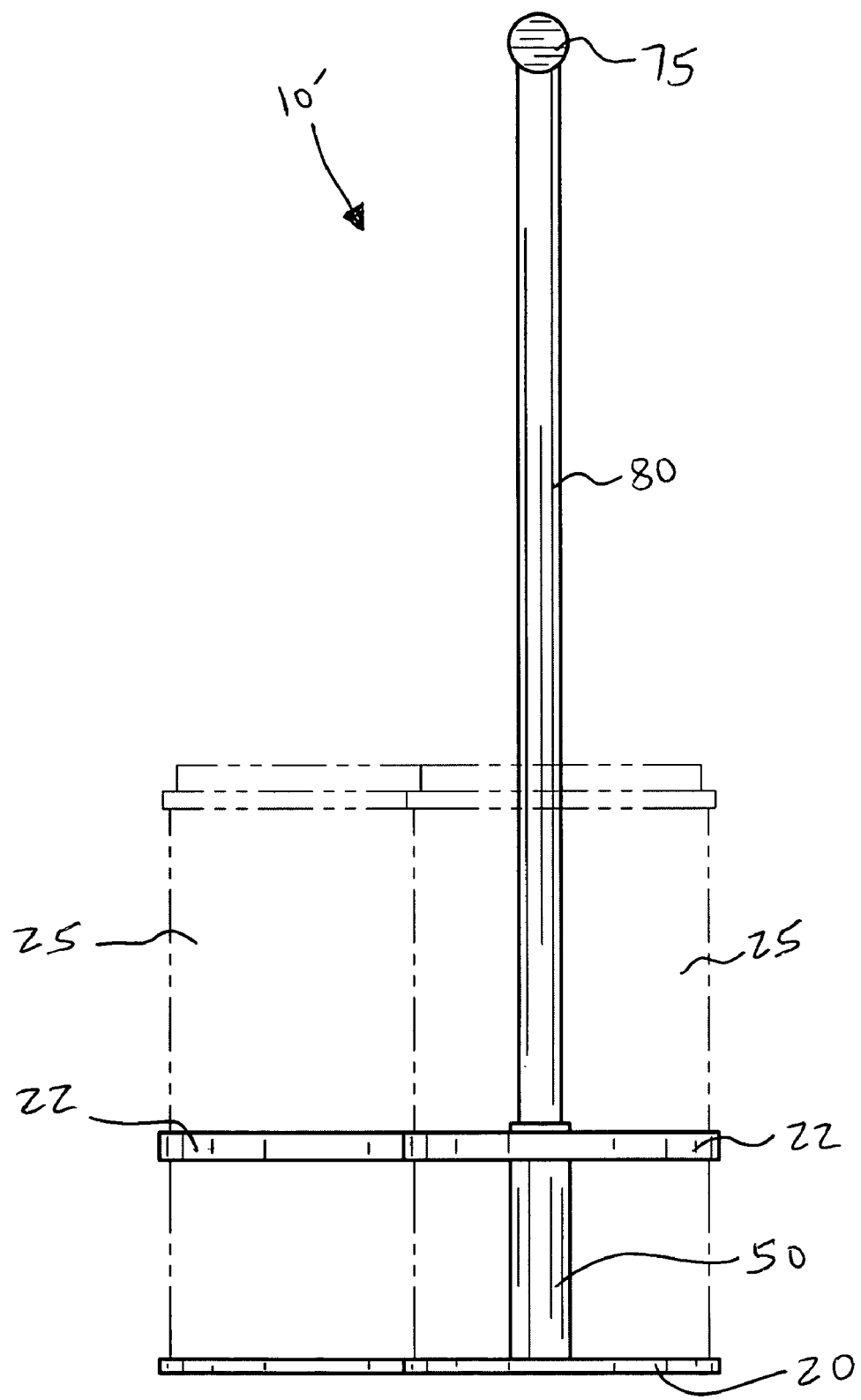
FIG. 10 is a front elevational view of the carrying apparatus shown in FIG. 9.
Figure 11:
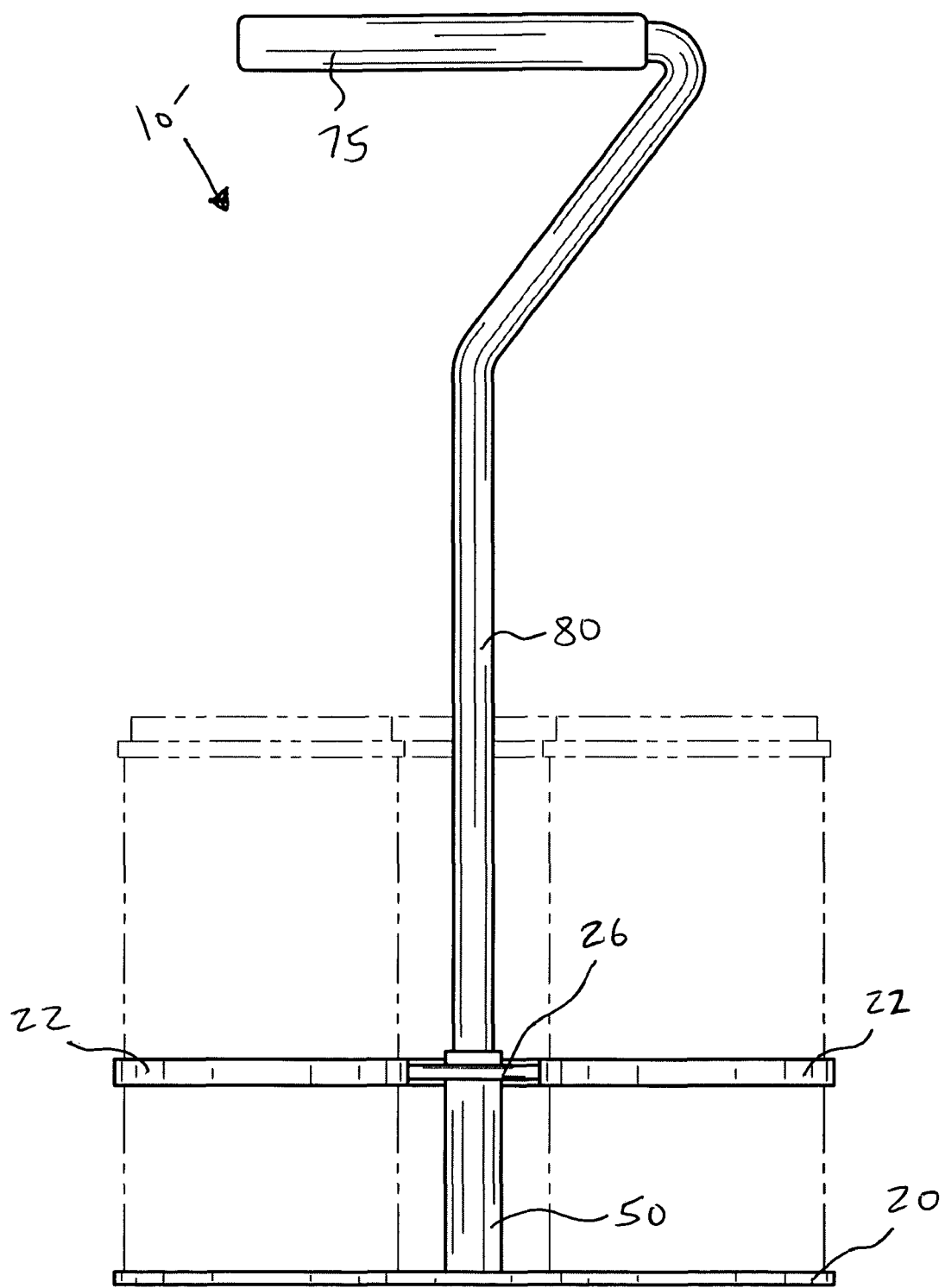
FIG. 11 is a right side elevational view of the carrying apparatus shown in FIG. 10.
Figure 12:
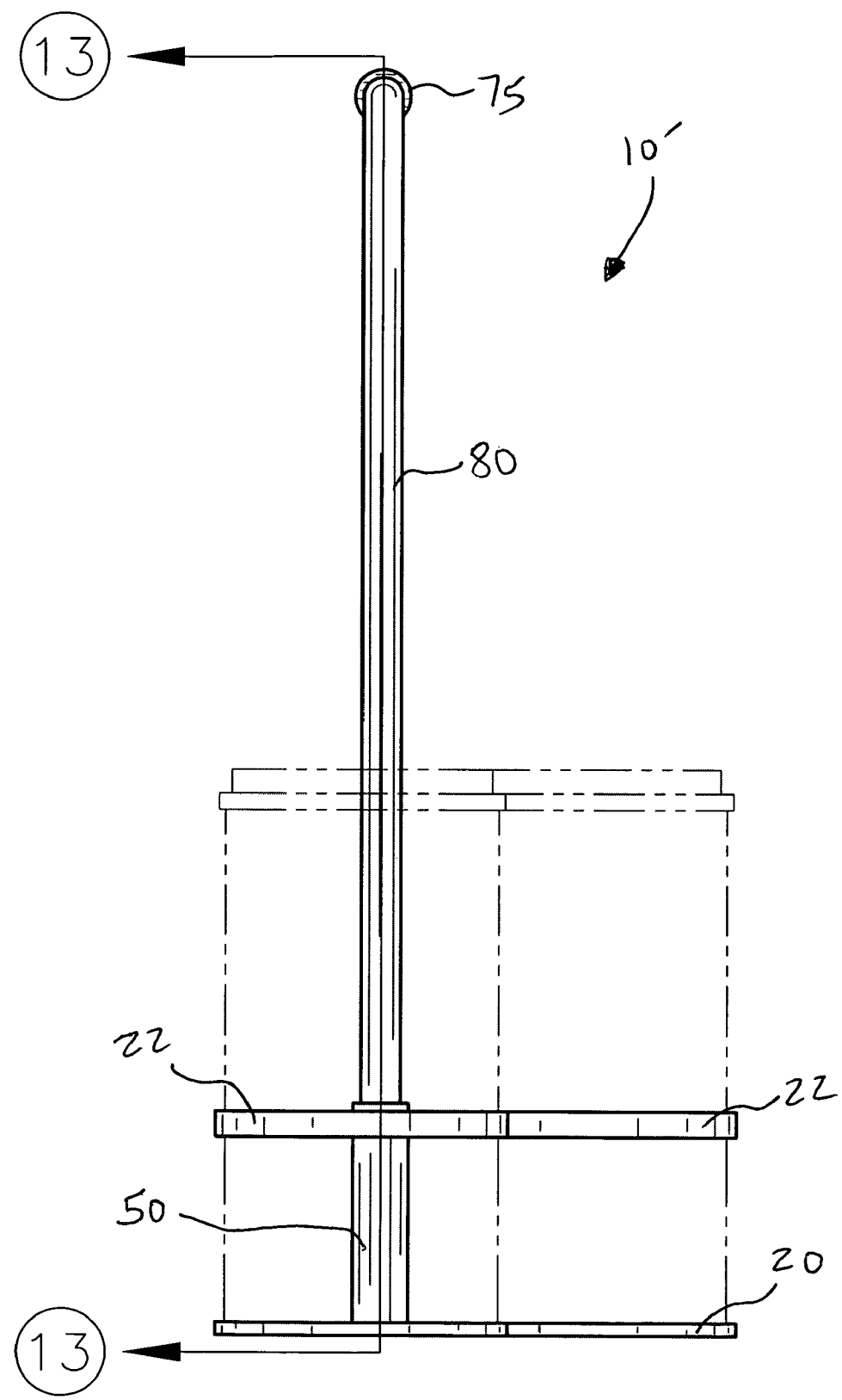
FIG. 12 is a rear elevational view of the carrying apparatus shown in FIG. 11.
Figure 13A:
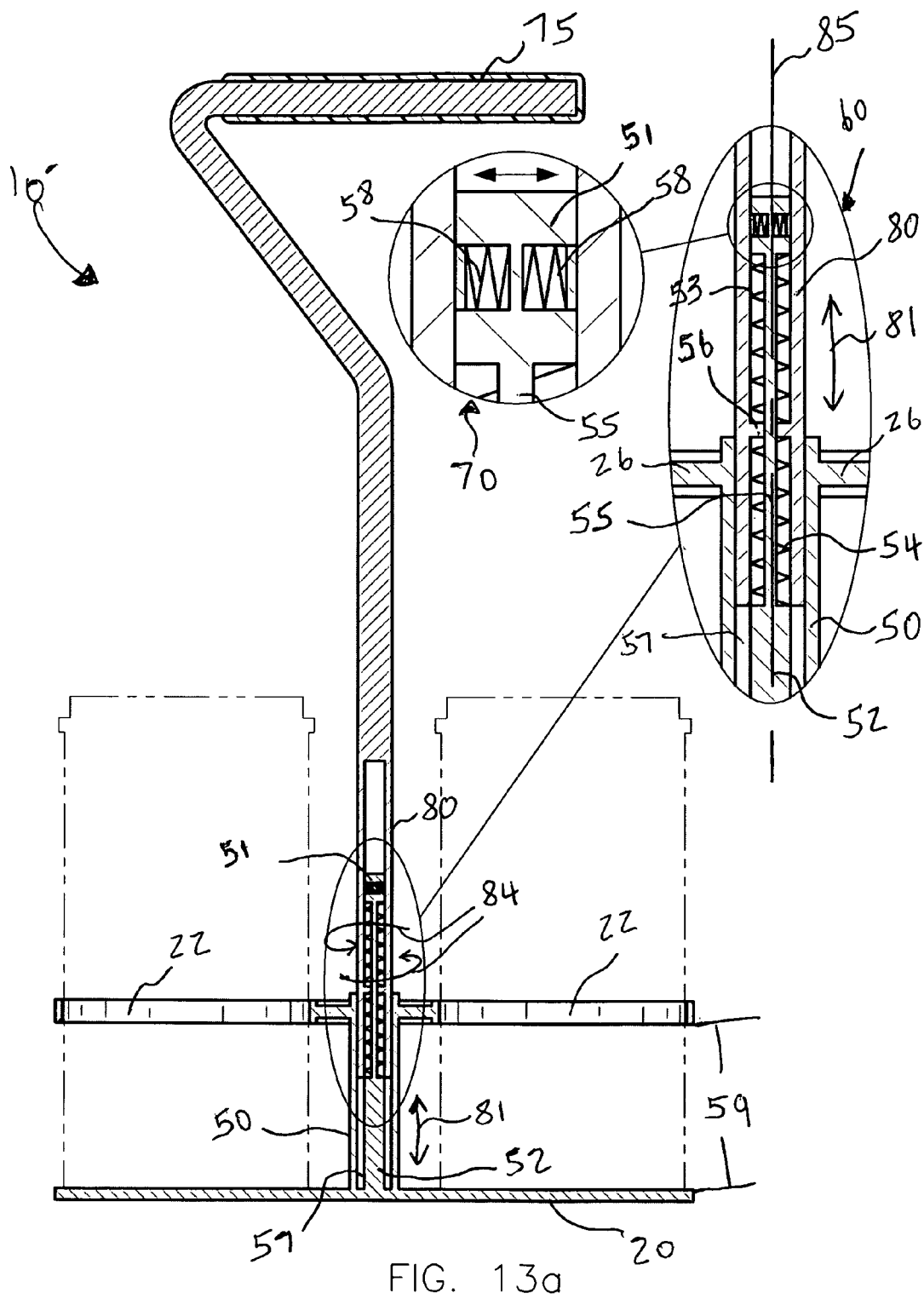
FIGS. 13a-13c are cross-sectional views showing the inter-relationship between the major components of the uniform reciprocating and articulating mechanisms employed by the alternate embodiment of the present invention.
Figure 13B:
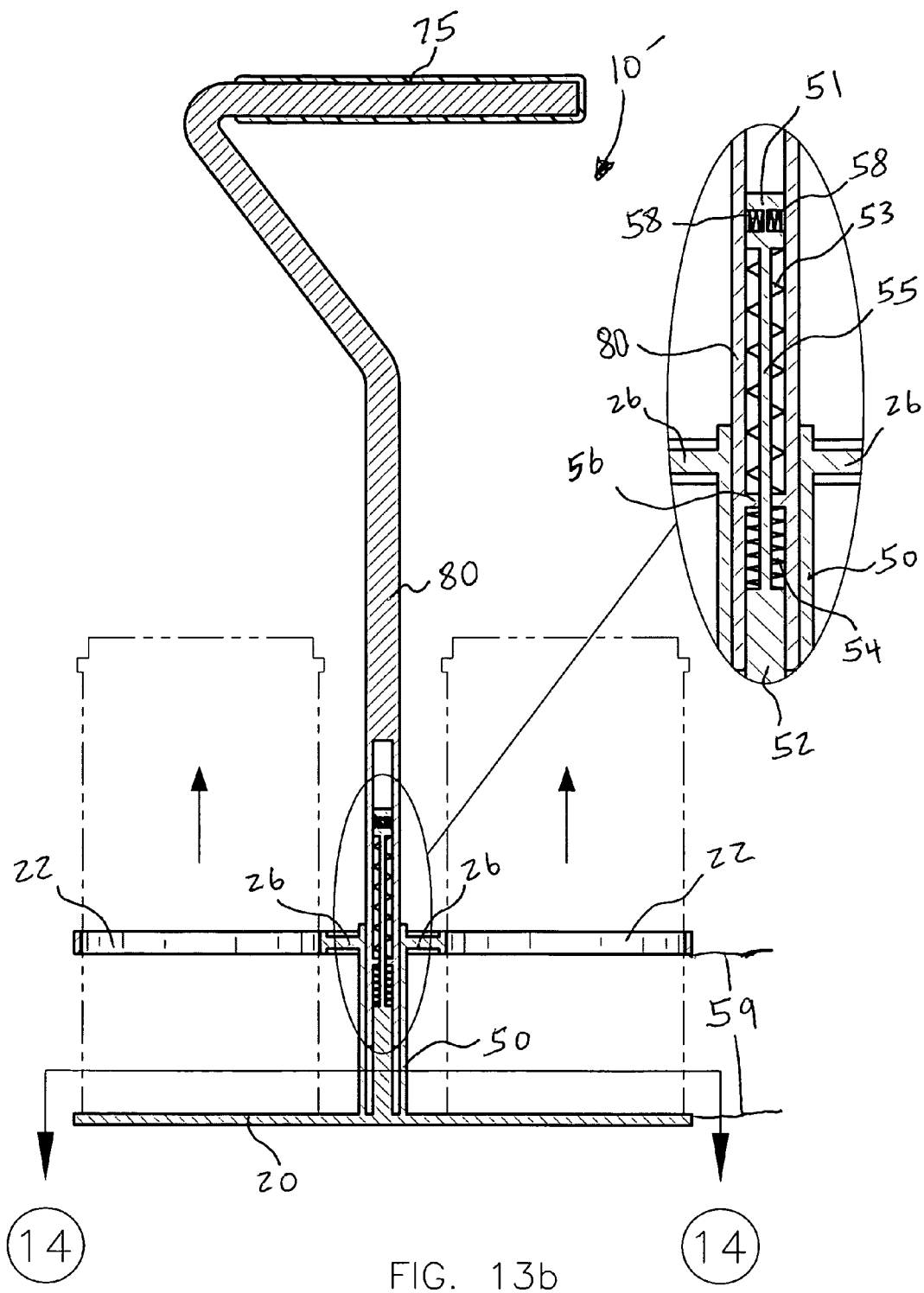
Figure 13C:
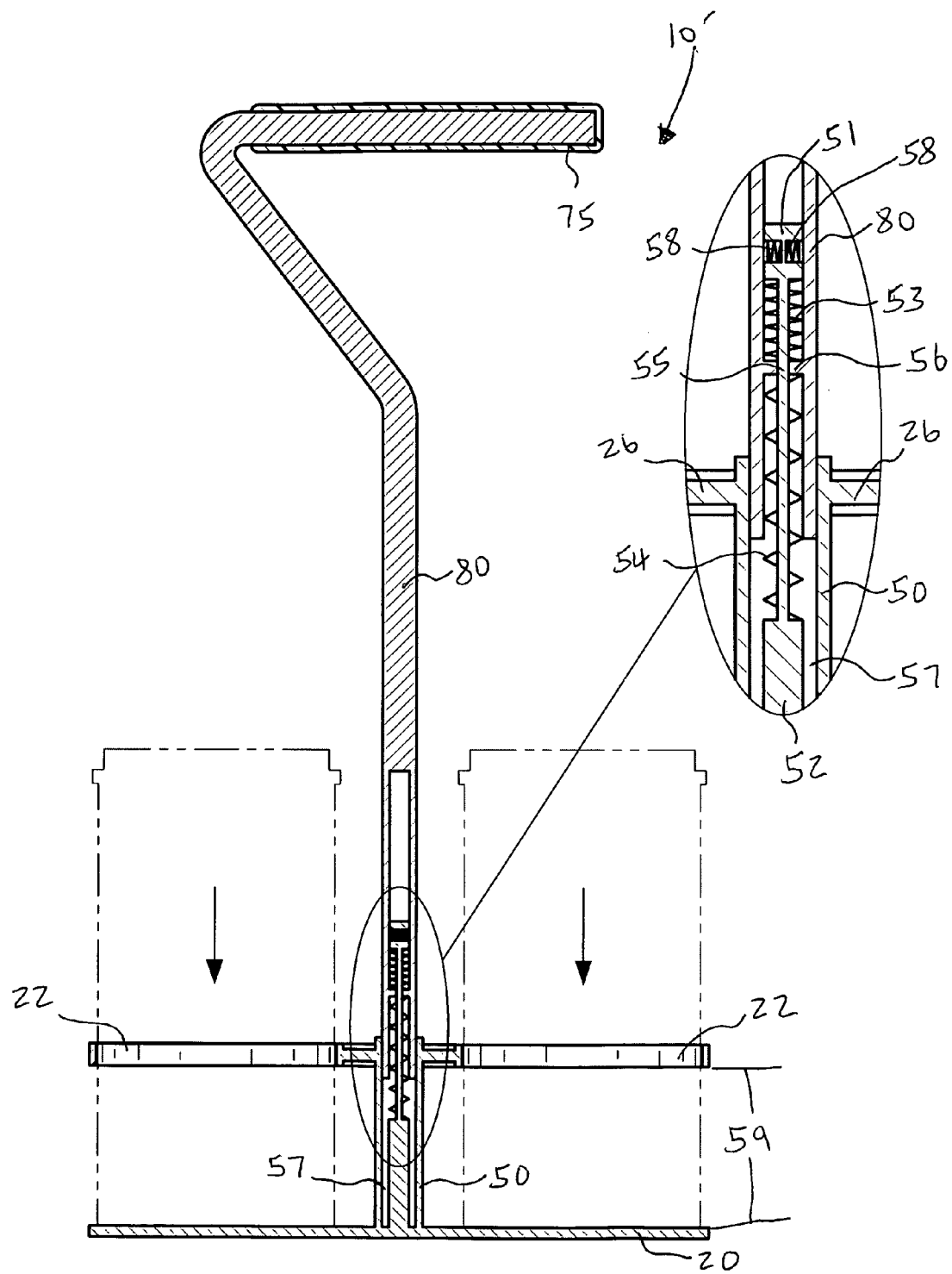
Figure 14:
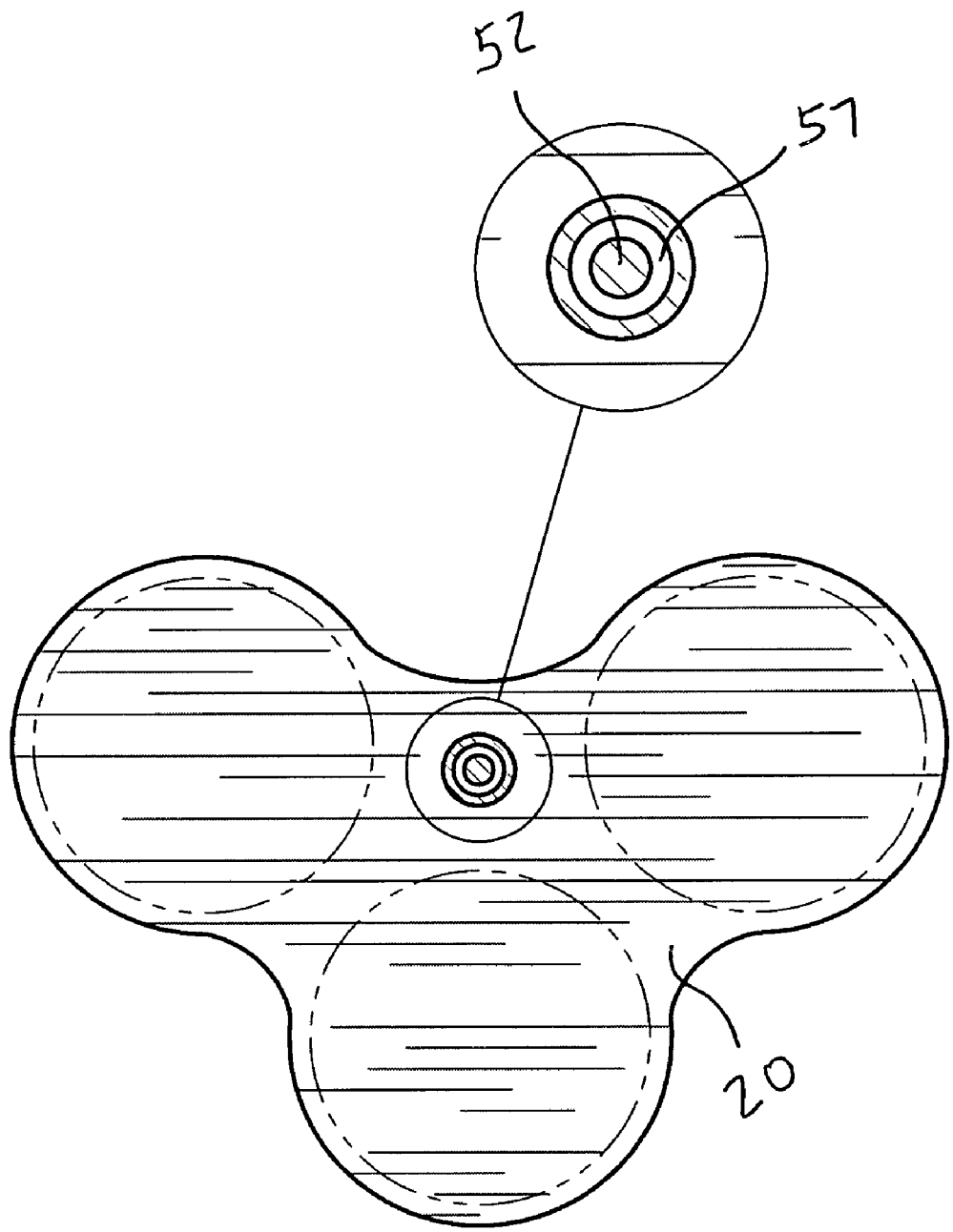
FIG. 14 is a cross-sectional view taken along line 14-14 in FIG. 13b.

The apparatus of this invention is referred to generally in the FIGS. 1-14 and is intended to provide a test-cylinder carrying apparatus 10 (also referred to as carrier 10). In general, one skilled in the art understands that the filled test-cylinders weigh approximately seven pounds each. It should be understood that the apparatus 10 may be used to carry many different types of cylinders and should not be limited in use with only those cylinders mentioned herein.

Referring initially to FIGS. 1-8, in one embodiment, the apparatus 10 includes a lightweight aluminum carrier 10 with a comfort grip. In one embodiment, the apparatus 10 may be designed to carry 4"×8" concrete test-cylinders. For example, exemplary embodiments may accommodate two or three test-cylinders, and to carry them securely, upright, and flat-bottomed (along a horizontal plane). Constructed of fabricated, medium-gauge aluminum, the carrier 10 may have a base-plate 20 that is preferably 11" wide. When viewed from above, base-plate 20 may resemble a figure eight pattern, for example.

The middle of carrier 10 may be approximately 1½ wide, and its end may be circular with approximately 4" diameters, for example. In the center of plate 20 may be a pre-drilled hole to receive a ⅜" diameter round stock aluminum handle 21, for example.

The test-cylinder carrying apparatus 10 is designed to hold the test-cylinders securely upright, and flat-bottomed. This is crucial for the proper curing of the concrete. Proper curing is crucial for the accuracy of the compressive-strength tests for which these samples are gathered. Thus, the test-cylinder carrying apparatus 10 may become an essential component of concrete field testing protocols.

In one embodiment, the handle 21 may rise vertically from the center of the base-plate 20 to a height of 19", for example. At a height of preferably 14½ above the base-plate 20, the handle 21 may turn out and up at approximately 45°, and preferably move outward about 5" along the axis of the base-plate 20. Then the handle 21 may make a second turn back toward the center, this time preferably running horizontally—and this is the handle 21 with the neoprene grip.

In one embodiment, the handle 21 may be oriented along the horizontal axis of the base-plate 20, such that the person carrying the apparatus 10 will have the unit comfortably aligned alongside, like a suitcase. At a point approximately 3" above the base-plate 20, a yoke-like arrangement of two aluminum support rings 22, preferably ⅜" in inner diameter, and preferably ¼" or ⅜" in thickness, may be welded to two or three aluminum rods 26 extending horizontally out from the shaft of the carrying handle 21. Such structural elements preferably form the guides or support rings 22 within which the test-cylinders can be carried.

Referring back to FIGS. 1-8, in a preferred embodiment, the concrete specimen carrying apparatus 10 is designed to simultaneously transport a plurality of existing concrete test cylinders 25 between remote locations. The concrete test-cylinder carrying apparatus preferably includes a handle 21 having a grip portion 75 attached thereto, and a base plate 20 having a smooth and continuous top surface. The base plate 20 may be statically engaged with a distal end of the handle 21, and a plurality of anchor rods 26 are preferably coupled to the handle 21. The anchor rods 26 may extend laterally away from the handle 21, and a plurality of support rings 22 may be connected directly to the anchor rods 26.

Such support rings 22 are preferably arranged in such a manner that the support rings 22 are horizontally aligned above the base plate 20. Notably, the support rings 22 and base plate 20 are suitably sized and shaped for receiving and maintaining the existing concrete test cylinders 25 at a substantially stable and vertically upright position during transport procedures. As noted hereinbelow, various quantities of support rings 22 may be employed and should not be limited to any specific number.

In one embodiment, the distal end of the handle 21 may be defined by a hollow female member 50 and a proximal end of the handle 21 may be defined by a hollow male member 80. Such male and female members 80, 50 may be telescopically interfitted with each other, as further explained hereinbelow. The anchor rods 26 and the support rings 22 may linearly extend along a horizontal plane that is registered parallel to the base plate 20. This is crucial for ensuring the concrete test samples 25 are not sloshed around during transport procedures because it will undesirably skew the test results.

In one embodiment 10', as best shown in FIGS. 9-14, the present invention may further include a mechanism 60 for uniformly reciprocating the male member 80 along a linear travel path 81 to thereby absorb operating forces exerted on the existing concrete test cylinders 25 during transport procedures. Notably, a linear distance 59 between the support rings 22 and the base plate 20 is maintained constant as the male member 80 uniformly reciprocates within the female member 50 and along the linear travel path 81. Such a linear travel path 81 is preferably registered parallel to corresponding longitudinal lengths of the male 80 and female member 50, respectively.

In particular, the uniform reciprocating mechanism 60 may further comprise a first plunger 51 dynamically seated within the male member 80 and further be frictionally abutted directly against an inner wall thereof. A second plunger 52 may be monolithically formed with the base plate 20 and statically nested inside the female member 50. The mechanism 60 may further include a stop member 56 statically anchored inside the male member 80 and intermediately positioned between the first 51 and second 52 plungers, respectively. In this manner, the stop member 56 is suitably sized and shaped such that the male member 80 is prohibited from being separated from the female member 50 as the male member 80 is reciprocated along the linear path 81, upon receiving high impact forces on the carrying apparatus 10'.

The uniform reciprocating mechanism 60 may further include a rectilinear shaft 55 having a fixed longitudinal length and further having axially opposed proximal and distal ends directly coupled to the first 51 and second 52 plungers respectively. The first plunger 51 is slidably housed within the male member 52 and remains continuously positioned above the stop member 56. Such an arrangement permits the first plunger 51 to slide within the male member while the second plunger 52 remains statically anchored to the base plate 20, for example. Advantageously, the support rings 22 remain positioned about the concrete test cylinders 25 when operating forces act upon the carrying apparatus 10' during transport procedures. This ensures the concrete test cylinders 25 will not prematurely fall off the base plate 20 during transport procedures.

Such a reciprocating mechanism 60 may further include first 53 and second 54 spring members anchored to the first 51 and second 52 plungers and the stop member 56 respectively. Each of the first 53 and second 54 spring members may be alternately compressed and expanded as the male member 80 is reciprocated along the linear path 81. In this manner, the first 53 and second 54 spring members absorb operating forces exerted on the male member 80 and thereby maintain a constant linear distance 59 between the support rings 22 and the base plate 20 as the male member 80 telescopically slides within the female member 50. For example, the first spring member 53 preferably expands about the shaft 55 while the second spring member 54 preferably compresses about the shaft 55 such that the first spring member 53 remains above the stop member 56 while the second spring member 54 remains below the stop member 56 during reciprocating movement. This ensures the male member 80 will not disengage the base plate 20 during transport procedures.

Such a mechanism 60 advantageously absorbs operating forces exerted on the existing concrete test cylinders 25 during transport procedures such as when an operator has to quickly travel over uneven terrain to take the concrete samples from the work field to a testing lab, for example. Notably, a linear distance 59 53 between the support rings 22 and the base plate 20 is maintained constant as the male member 80 uniformly reciprocates along the linear travel path 81 and thereby reduces the likelihood of permitting undesirable concrete sloshing inside the test cylinders 25.

In the alternate embodiment, the concrete test-cylinder carrying apparatus 10' may further include a mechanism 70 for uniformly articulating the male member 80 along clockwise and counter clockwise arcuate paths 84 to thereby absorb operating forces exerted on the existing concrete test cylinders 25 during transport procedures. The clockwise and counter clockwise arcuate paths 84 may be defined about a fulcrum axis 85 passing through the male 80 and female 50 members.

Notably, the support rings 22 and the base plate 20 remain statically aligned and uniformly spaced apart as the male member 80 is uniformly rotated along the clockwise and counter clockwise arcuate paths 84. In this manner, as an operator's hand naturally rotates as he/she transports the concrete test cylinders 25, the likelihood of undesirably sloshing the concrete inside the test cylinders 25 is reduced. This ensures the concrete test cylinders 25 are maintained at a substantially stable and vertically upright position during natural hand/arm movement while transporting the test cylinders 25.

In this manner, the support rings 22 remain positioned about the concrete test cylinders 25 when impact forces act upon the carrying apparatus 10' during transport procedures. Advantageously, the linear distance 59 between the support rings 22 and the base plate 20 remains constant during reciprocating displacement of the male member 80 and thereby ensures the concrete test cylinders 25 will not prematurely fall off the base plate 20 during transport procedures.

The uniform articulating mechanism 70 further includes an annular track 57 formed about the second plunger 52 and defined within the female member 50. A plurality of spring-actuated cams 58 are diametrically offset from a center of the first plunger 51 such that the spring-actuated cams 58 continuously urge against an interior wall of the male member 80 to thereby create a frictional force opposing random and premature rotation of the male member 80.

Thus, a distal end of the male member 80 uniformly rotates within the track 57 when the operating forces are exerted against the handle 21. Advantageously, the distal end of the male member 80 may simultaneously rotate within the track 57 while the male member 80 linearly reciprocates along the linear path 81 for absorbing both arcuate and linear operating forces during transport procedures respectively. The combination of absorbing both linear and arcuate operating forces reduces the likelihood of undesirable sloshing during transport because the operating forces are absorbed through the rotational movement between the handle 21 and base plate 20.

The present invention may further include a method for simultaneously transporting a plurality of existing concrete test cylinders 25 between remote locations. Such a method preferably includes the chronological steps of: providing a handle 21 having a grip portion 75 attached thereto; providing a base plate 20 having a smooth and continuous top surface; and statically engaging the base plate 20 with a distal end of the handle 21.

The method may further include the chronological steps of: providing and coupling a plurality of anchor rods 26 to the handle 21 such that the anchor rods 26 extend laterally away from the handle 21; providing and connecting a plurality of support rings 22 directly to the anchor rods 26; and arranging the support rings 22 in such a manner that the support rings 22 are horizontally aligned above the base plate 20.

The method may further include the chronological steps of: the support rings 22 and the base plate 20 receiving and maintaining the existing concrete test cylinders 25 at a substantially stable and vertically upright position during transport procedures; and absorbing operating forces exerted on the existing concrete test cylinders 25 during transport procedures by uniformly reciprocating the male member 80 along a linear travel path 81 as well as uniformly articulating the male member 80 along clockwise and counter clockwise arcuate paths 84. Notably, a linear distance 59 between the support rings 22 and the base plate 20 is maintained constant as the male member 80 uniformly reciprocates within the female member 50 and along the linear travel path 81 to prevent premature concrete sloshing during transport.

Use of the apparatus 10 would be simple and straightforward. The concrete-filled, plastic test-cylinders 25 will fit snuggly and securely into the yoke-like support rings 22, and will sit flat on the base-plate 20. By lifting the carrying handle, one can easily transport two concrete test-cylinders 25. And, if the apparatus 10 were adapted from the two-cylinder embodiment to the three-cylinder embodiment, one could, if sufficiently strong, carry six cylinders 25 at once.

As noted above, in one embodiment, the test-cylinder carrying apparatus 10 may be designed to simultaneously carry two test cylinders, in a secure and upright orientation, thus saving a certified technician the effort of making one trip with each cylinder. Because 6 test-cylinders are typically required for state and commercial use, and 4 test-cylinders are typically required for pre-cast concrete industry, these trips—carrying the test-cylinders to the site for field-curing—add up to a lot of excess carrying.

With the carrier 10 of the present invention, these trips would be reduced, at minimum, by half. If the testing technician were to use two carriers 10, the trips could be reduced 75%. If the technician were to use the three-cylinder embodiment of the carrier 10, the trips could be reduced by 83%.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A concrete test-cylinder carrying apparatus for simultaneously transporting a plurality of existing concrete test cylinders between remote locations, said concrete test-cylinder carrying apparatus comprising:
   a handle;
   a base plate statically engaged with a distal end of said handle;
   a plurality of anchor rods coupled to said handle; and
   a plurality of support rings connected directly to said anchor rods and being arranged in such a manner that said support rings are horizontally aligned above said base plate;
   wherein said support rings and said base plate are suitably sized and shaped for receiving and maintaining the existing concrete test cylinders at a substantially stable and vertically upright position during transport procedures;
   wherein said distal end of said handle is defined by a hollow female member;
   wherein a proximal end of said handle is defined by a hollow male member;
   wherein said male and female members are telescopically interfitted with each other.

2. The concrete test-cylinder carrying apparatus of claim 1, wherein said anchor rods and said support rings linearly extend along a horizontal plane that is registered parallel to said base plate.

3. The concrete test-cylinder carrying apparatus of claim 2, further comprising:
   means for uniformly reciprocating said male member along a linear travel path to thereby absorb operating forces exerted on the existing concrete test cylinders during transport procedures;
   wherein a linear distance between said support rings and said base plate is maintained constant as said male member uniformly reciprocates within said female member and along the linear travel path;
   wherein said linear travel path is registered parallel to corresponding longitudinal lengths of said male and female members respectively.

4. The concrete test-cylinder carrying apparatus of claim 3, wherein said uniform reciprocating means further comprises:
   a first plunger dynamically seated within said male member and further being frictionally abutted directly against an inner wall thereof;
   a second plunger monolithically formed with said base plate and statically nested inside said female member; and
   a stop member statically anchored inside said male member and intermediately positioned between said first and second plungers respectively, said stop member being suitably sized and shaped such that said male member is prohibited from being separated from said female member as said male member is reciprocated along the linear travel path.

5. The concrete test-cylinder carrying apparatus of claim 4, wherein said uniform reciprocating means further comprises:
   a rectilinear shaft having a fixed longitudinal length and further having axially opposed proximal and distal ends directly coupled to said first and second plungers respectively;
   wherein said first plunger is slidably housed within said male member and remains continuously positioned above said stop member;
   first and second spring members anchored to said first and second plungers and said stop member respectively, each of said first and second spring members being alternately compressed and expanded as said male member is reciprocated along the linear travel path;
   wherein said first and second spring members absorb operating forces exerted on said male member and thereby maintain a constant linear distance between said support rings and said base plate as said male member telescopically slides within said female member;
   wherein said first spring member is expanded about said shaft while said second spring member is compressed about said shaft such that said first spring member remains above said stop member while said second spring member remains below said stop member during reciprocating movement.

6. The concrete test-cylinder carrying apparatus of claim 4, further comprising:
   means for uniformly articulating said male member along clockwise and counter clockwise arcuate paths to thereby absorb operating forces exerted on the existing concrete test cylinders during transport procedures, said clockwise and counter clockwise arcuate paths being defined about a fulcrum axis passing through said male and female members;

wherein said support rings and said base plate remain statically aligned and uniformly spaced apart as said male member is uniformly rotated along the clockwise and counter clockwise arcuate paths.

7. The concrete test-cylinder carrying apparatus of claim 6, wherein said uniform articulating means comprises:
   an annular track formed about said second plunger and defined within said female member;
   a plurality of spring-actuated cams diametrically offset from a center of said first plunger such that said spring-actuated cams continuously urge against an interior wall of said male member to thereby create a frictional force opposing random and premature rotation of said male member; and
   wherein a distal end of said male member uniformly rotates within said track when the operating forces are exerted against said handle;
   wherein said distal end of said male member simultaneously rotates within said track while said male member linearly reciprocates along the linear travel path for absorbing both arcuate and linear operating forces during transport procedures respectively.

8. A concrete test-cylinder carrying apparatus for simultaneously transporting a plurality of existing concrete test cylinders between remote locations, said concrete test-cylinder carrying apparatus comprising:
   a handle having a grip portion attached thereto;
   a base plate having a smooth and continuous top surface, said base plate being statically engaged with a distal end of said handle;
   a plurality of anchor rods coupled to said handle and extending laterally away therefrom; and
   a plurality of support rings connected directly to said anchor rods and being arranged in such a manner that said support rings are horizontally aligned above said base plate;
   wherein said support rings and said base plate are suitably sized and shaped for receiving and maintaining the existing concrete test cylinders at a substantially stable and vertically upright position during transport procedures;
   wherein said distal end of said handle is defined by a hollow female member;
   wherein a proximal end of said handle is defined by a hollow male member;
   wherein said male and female members are telescopically interfitted with each other.

9. The concrete test-cylinder carrying apparatus of claim 8, wherein said anchor rods and said support rings linearly extend along a horizontal plane that is registered parallel to said base plate.

10. The concrete test-cylinder carrying apparatus of claim 9, further comprising:
   means for uniformly reciprocating said male member along a linear travel path to thereby absorb operating forces exerted on the existing concrete test cylinders during transport procedures;
   wherein a linear distance between said support rings and said base plate is maintained constant as said male member uniformly reciprocates within said female member and along the linear travel path;
   wherein said linear travel path is registered parallel to corresponding longitudinal lengths of said male and female members respectively.

11. The concrete test-cylinder carrying apparatus of claim 10, wherein said uniform reciprocating means further comprises:
   a first plunger dynamically seated within said male member and further being frictionally abutted directly against an inner wall thereof;
   a second plunger monolithically formed with said base plate and statically nested inside said female member; and
   a stop member statically anchored inside said male member and intermediately positioned between said first and second plungers respectively, said stop member being suitably sized and shaped such that said male member is prohibited from being separated from said female member as said male member is reciprocated along the linear travel path.

12. The concrete test-cylinder carrying apparatus of claim 11, wherein said uniform reciprocating means further comprises:
   a rectilinear shaft having a fixed longitudinal length and further having axially opposed proximal and distal ends directly coupled to said first and second plungers respectively;
   wherein said first plunger is slidably housed within said male member and remains continuously positioned above said stop member;
   first and second spring members anchored to said first and second plungers and said stop member respectively, each of said first and second spring members being alternately compressed and expanded as said male member is reciprocated along the linear travel path;
   wherein said first and second spring members absorb operating forces exerted on said male member and thereby maintain a constant linear distance between said support rings and said base plate as said male member telescopically slides within said female member;
   wherein said first spring member is expanded about said shaft while said second spring member is compressed about said shaft such that said first spring member remains above said stop member while said second spring member remains below said stop member during reciprocating movement.

13. The concrete test-cylinder carrying apparatus of claim 11, further comprising:
   means for uniformly articulating said male member along clockwise and counter clockwise arcuate paths to thereby absorb operating forces exerted on the existing concrete test cylinders during transport procedures, said clockwise and counter clockwise arcuate paths being defined about a fulcrum axis passing through said male and female members;
   wherein said support rings and said base plate remain statically aligned and uniformly spaced apart as said male member is uniformly rotated along the clockwise and counter clockwise arcuate paths.

14. The concrete test-cylinder carrying apparatus of claim 13, wherein said uniform articulating means comprises:
   an annular track formed about said second plunger and defined within said female member;
   a plurality of spring-actuated cams diametrically offset from a center of said first plunger such that said spring-actuated cams continuously urge against an interior wall of said male member to thereby create a frictional force opposing random and premature rotation of said male member; and
   wherein a distal end of said male member uniformly rotates within said track when the operating forces are exerted against said handle;
   wherein said distal end of said male member simultaneously rotates within said track while said male member linearly reciprocates along the linear travel path for absorbing both arcuate and linear operating forces during transport procedures respectively.

15. A method for simultaneously transporting a plurality of existing concrete test cylinders between remote locations, said method comprising the chronological steps of:
   a. providing a handle having a grip portion attached thereto;
   b. providing a base plate having a smooth and continuous top surface;
   c. statically engaging said base plate with a distal end of said handle;
   d. providing and coupling a plurality of anchor rods to said handle such that said anchor rods extend laterally away from said handle;
   e. providing and connecting a plurality of support rings directly to said anchor rods;
   f. arranging said support rings in such a manner that said support rings are horizontally aligned above said base plate;
   g. said support rings and said base plate receiving and maintaining the existing concrete test cylinders at a substantially stable and vertically upright position during transport procedures; and
   h. absorbing operating forces exerted on the existing concrete test cylinders during transport procedures by uniformly reciprocating said male member along a linear travel path as well as uniformly articulating said male member along clockwise and counter clockwise arcuate paths;
   wherein a linear distance between said support rings and said base plate is maintained constant as said male member uniformly reciprocates within said female member and along the linear travel path.

\* \* \* \* \*